United States Patent [19]
Heisel et al.

[11] Patent Number: 5,628,977
[45] Date of Patent: May 13, 1997

[54] PROCESS FOR THE DESULFURIZATION OF A CRUDE GAS CONTAINING $H_2S$

[75] Inventors: Michael Heisel, Pullach; Freimut Marold, Ottobrunn, both of Germany

[73] Assignee: Linde Aktiengesellschaft, Wiesbaden, Germany

[21] Appl. No.: 436,471

[22] PCT Filed: Nov. 24, 1993

[86] PCT No.: PCT/EP93/03300

§ 371 Date: May 26, 1995

§ 102(e) Date: May 26, 1995

[87] PCT Pub. No.: WO94/12430

PCT Pub. Date: Jul. 9, 1994

[30] Foreign Application Priority Data

Nov. 26, 1992 [DE] Germany ............ 42 39 811.8

[51] Int. Cl.$^6$ ............ B01D 53/48; B01D 53/50; B01D 53/52

[52] U.S. Cl. .................. 423/573.1; 423/574.1; 423/220; 423/222; 423/224; 423/242.1

[58] Field of Search ............ 423/574.1, 573.1, 423/244.01, 242.2, 242.1, 230, 224, 222, 220

[56] References Cited

U.S. PATENT DOCUMENTS

| | | | |
|---|---|---|---|
| 4,088,743 | 5/1978 | Hass et al. | 423/539 |
| 4,405,593 | 9/1983 | Schlauer et al. | 423/574 R |
| 4,632,819 | 12/1986 | Fischer et al. | 423/574 R |
| 4,795,620 | 1/1989 | Heisel et al. | 423/243 |
| 4,797,268 | 1/1989 | McGovern et al. | 423/574 R |
| 5,035,810 | 7/1991 | Heisel et al. | 210/750 |
| 5,304,361 | 4/1994 | Parisi | 423/220 |

FOREIGN PATENT DOCUMENTS

| | | |
|---|---|---|
| 0049008 | 4/1982 | European Pat. Off. . |
| 0141169 | 5/1985 | European Pat. Off. . |
| 0160332 | 11/1985 | European Pat. Off. . |
| 0252497 | 1/1988 | European Pat. Off. . |
| 3842599 | 6/1990 | Germany . |

OTHER PUBLICATIONS

Sander et al. "Sulfur, Sulfur Dioxide & Sulfuric Acid" (1984) British Sulfur Corp., London G.B., pp. 56–59 no month.

Heisel et al. "DAS Clintox-Verfahren zur Reinigung von Claus-Abgasen" (1989) Linde Berichte Aus Technik und Wissenschaft No. 63 Wiesbaden DE, pp. 13–15 (no month).

*Primary Examiner*—Gary P. Straub
*Assistant Examiner*—Timothy C. Vanoy
*Attorney, Agent, or Firm*—Millen, White, Zelano & Branigan, P.C.

[57] ABSTRACT

The invention relates to a process for the desulfurization of a crude gas stream containing at least $H_2S$ in a Claus plant, afterburning of Claus waste gas, and gas washing of the waste gas from the afterburning to remove $SO_2$, in which $SO_2$ recovered by the gas washing is recycled to a point before the Claus plant. According to the invention, within the Claus plant, between 60% and 90%, preferably between 67% and 85%, and especially preferably between 67% and 80% of the sulfur contained in the crude gas is separated directly from the crude gas, and between 33% and 10%, preferably between 25% and 10%, and especially preferably between 20% and 15% of the sulfur originally contained in the crude gas is recycled as $SO_2$. The gas washing to remove $SO_2$ is advantageously carried out with an absorbing agent having a physical action. A partial stream of the crude gas can be conveyed directly into the afterburning, bypassing the Claus plant. In addition to a Claus reactor operated at a temperature of between 850° and 1300° C., preferably between 900° and 1100° C., the Claus plant can contain one or more catalytic and/or thermal reactors for sulfur production and condensers for sulfur recovery, use only thermal stages for sulfur production, or consist of a direct-oxidation Claus plant.

17 Claims, 5 Drawing Sheets

PROCESS FOR THE DESULFURIZATION OF A CRUDE GAS CONTAINING $H_2S$

BACKGROUND OF THE INVENTION

The invention relates to a process for the desulfurization of a crude gas stream containing at least $H_2S$ in a Claus plant, afterburning of the Claus waste gas, and gas washing (scrubbing) of the waste gas from the afterburning to remove $SO_2$, in which case $SO_2$ recovered by the gas scrubbing is recycled to a point before the Claus plant.

Claus plants are widely used to recover elementary sulfur from gas streams containing $H_2S$. In this connection, a part of the $H_2S$ is combusted to $SO_2$ in a Claus reactor. $SO_2$ and any remaining $H_2S$ are reacted to form elementary sulfur and water in catalytic/thermal reactors corresponding to the Claus furnace. Claus plants have proven themselves very well in practice. But the degree of desulfurization that can be achieved with a clean Claus plant (depending on design and operation, between 90% and 97% of crude gas sulfur) does not satisfy today's requirements for reducing sulfur emissions to the atmosphere. To increase the degree of desulfurization and thus to reduce sulfur emissions, additional plant facilities downstream from the Claus plant are necessary for further treatment of the Claus waste gas. This further treatment of the Claus waste gas is usually referred to as "tail gas treatment."

A known process variant calls, for example, for the continuation of the reaction of the bound sulfur in elementary sulfur, which is incomplete in the Claus plant. In downstream catalysts (additional catalytic Claus stages), the reaction to sulfur continues corresponding to thermodynamic equilibrium at a reduced temperature level below the dew point of sulfur (sub-dew-point process), and simultaneously elementary sulfur is adsorbed on the catalyst. In this way, several reactors are periodically regenerated or switched to adsorption. Only by careful adjustment of the purge gas composition during regeneration can early deactivation of the catalyst be avoided. Contaminated, sulfur-containing gases must, if they cannot be handled in the Claus plant, be disposed of in some other way. Sulfur components COS and $CS_2$ carried by the Claus waste gas are hydrolyzed to $H_2S$ and $CO_2$ to only a small extent and thus increase the sulfur burden in the waste gases. Spent catalysts must be disposed of. With such processes, degrees of desulfurization of up to 99.6% are achieved with relatively low operating and investment costs or up to 99.8% are achieved with considerably increased costs.

Another variant (direct oxidation process) for further treatment of the Claus waste gas comprises the hydrogenation of all sulfur compounds that are also contained in the Claus waste gas into $H_2S$. $H_2S$ that is produced is chemically bonded by an aqueous absorption agent in an oxidative scrubbing or separated in a water-separation stage with catalytic oxidation. The oxidative scrubbing makes a sulfur yield of 99.9% possible, but with very high operating and investment costs. In the case of the catalytic-oxidative process, the degree of desulfurization remains limited to a maximum of 99.8% due to thermodynamic factors.

The so-called recycling processes, which all together comprise a gas scrubbing, teach a third variant of the further treatment of Claus waste gases. In this case, however, the Claus waste gas must first be completely hydrogenated or oxidized. When the Claus waste gas is hydrogenated, the resulting $H_2S$ is scrubbing out in a chemical absorption step. When the scrubbing agent is regenerated, $H_2S$ is released in concentrated form and can be fed to the Claus plant. For the reduction of $H_2S$, gases with hydrogen, carbon monoxide, or gas mixtures consisting of these substances are used. The degree to which the sulfur compounds are reacted into $H_2S$ depends on the activity of the catalyst. During reaction to $H_2S$, COS can occur in the presence of carbon—for example in the form of CO—which is to be reacted separately. The reaction to $H_2S$ requires an excess of reducing gas, so that depending on the $SO_2$ content of the Claus waste gases, afterburning (combustion) of the scrubbed gases is necessary. Since, in addition to $H_2S$, $CO_2$ is also absorbed by the scrubbing agent, an $CO_2/H_2S$ mixture is produced as recycled gas to the Claus plant. Due to the recycling of the recycled gas to the Claus plant, said plant must be suitably enlarged. The spent catalyst must be disposed of. In the way described, a satisfactory rate of desulfurization can be achieved, but at very high investment and operating costs. In the second case, the sulfur compounds contained in Claus waste gas are oxidized to $SO_2$, and the waste gas from the (combustion zone) is provided to a downstream gas scrubbing to ensure $SO_2$ removal, and $SO_2$ recovered by the gas scrubbing is recycled to a point before the Claus plant. The Claus waste gas is combusted using a combustible gas that is to be provided for the afterburning stage. Drawbacks of this approach are the emission of $CO_2$, CO and $H_2$, as well as the accumulation of contaminated waste water and other residues, whose removal or working-up is associated with high costs.

A feature that is common to all previously described known processes is that they process the Claus waste gas of a Claus plant that is optimized and maximized for sulfur recovery.

SUMMARY OF THE INVENTION

The object of this invention is to provide a process of the type mentioned in the introduction, which makes it possible to improve the environmental compatibility of the entire plant at very high sulfur recovery rates and also especially to reduce the other emissions and accumulating residues, in addition to the sulfur emissions.

This object is achieved according to the invention in that within the Claus plant, between 60% and 90%, preferably between 67% and 85%, and especially preferably between 67% and 80% of the sulfur contained in the crude gas in the Claus plant, is separated directly from the crude gas, and between 33% and 10%, preferably between 25% and 10%, and especially preferably between 20% and 15% of the sulfur originally contained in the crude gas is recycled as $SO_2$.

The way the process is carried out according to the invention is decisively marked by the fact that, in contrast to what was previously known and contrary to the prevailing opinion of experts, the separation of sulfur directly from the crude gas in the Claus plant is intentionally not optimized or maximized, but rather is optimized within the framework of the overall process. Surprisingly, it has turned out that a very high sulfur recovery rate of over 99.9% and other advantages can be achieved by the way the process is carried out according to the invention, although the direct separation of sulfur from the crude gas in the Claus plant is not optimized. The Claus plant, the afterburning (combustion), and the $SO_2$ scrubbing are designed according to the invention in such a way that the Claus waste gas has as many combustible components as possible, so that the afterburning operates with minimal use of outside energy or the amount of additional combustible gas needed is significantly reduced.

When Claus plants are operated conventionally, the $SO_2$ required for the Claus reaction is generated by hypostoichiometric combustion of $H_2S$ with air. To this end, combustion air is usually fed to the Claus furnace, and the oxygen of the combustion air is used to oxidize the sulfur compounds to $SO_2$. But about 4 mol of $N_2$ is introduced in the Claus furnace with each mol of $O_2$ from air, thus introducing a large amount of inert gas into the Claus plant:

$$3H_2S+3/2\ O_2+(6\ N_2)=2\ H_2S+SO_2+H_2O+(6\ N_2)=3/x\ S_x+3\ H_2O+(6\ N_2).$$

The recovery of sulfur in the process according to the invention is, however, essentially determined by the equation $$2H_2S+O_2=3/x\ S_x+2\ H_2O.$$

Since the $SO_2$ concentration in the case of $SO_2$ recycling in the recycle stream according to the invention is typically over 90 mol % of $SO_2$, almost no inert gas is fed to the Claus plant in the process according to the invention. Increased $SO_2$ recycling thus means a smaller total stream through the Claus plants. Thus, the capacity of a Claus plant is increased by the high $SO_2$ recycling according to the invention. The increase in capacity is to be explained using two examples. Let the gas stream of a conventional Claus plant at 100 kmol/h stand for a capacity of the Claus plant of 100%. In the case of $SO_2$ recycling of 5% of the crude gas sulfur, the gas stream through the Claus plant drops to 95 kmol/h, while the capacity of the Claus plant increases to 105.3%. With an $SO_2$ recycling level of 15% of crude gas sulfur, the gas stream is reduced by the Claus plant to 84 kmol/h, while the capacity of the Claus plant increases to 119.0%.

As stated above, the capacity of the Claus plant is increased by the higher $SO_2$ recycling before the Claus plant. But the operating costs of the Claus plant are thus also lower overall since longer catalyst service lives are achieved due to higher tolerable catalyst aging. In the process according to the invention, $COS/CS_2$ hydrolysis in the first Claus furnace is no longer necessary since both components are oxidized in the afterburning to $SO_2$ and are recycled to the Claus plant via the gas washing. Due to the way the process is carried out according to the invention, the expensive and sensitive adjustment of the $H_2S:SO_2$ ratio that is optimum for the Claus reaction is significantly simplified since this ratio has to be precisely adjusted only over the long term, not constantly (an "air demand analyzer" of the Claus plant can be eliminated).

Dirty Claus crude gas streams, which in addition to $H_2S$ also contain HCN, $NH_3$, carbonyls, phenols or other hydrocarbons, lead to difficulties in conventional processes because of incomplete combustion in the Claus furnace. In the process according to the invention, such problems do not occur. On the contrary, the process according to the invention fully uses the heating value of these problem substances. Typically, CO, $H_2$, $H_2S$, sulfur vapor, and organic sulfur compounds are contained in Claus waste gas. All these combustible components are used as combustible gas in the afterburning according to the invention. As a result, additional fuel is saved, which results in lower operating costs and in lower emissions of $CO_2$, which has now been included in the list of harmful gases as "a greenhouse gas." In the case of afterburning, water is produced particularly from $H_2$, $H_2S$ and $NH_3$, as well as $SO_2$ from $CS_2$, $S_2$, $H_2S$ and COS, but also $CO_2$ from CO, COS, $CS_2$. All of these components are already contained in the crude gas. Very little outside energy in the form of combustible gas is therefore needed in the process according to the invention. Thus, the amount of waste gas of the entire plant is significantly reduced compared to known processes. The process according to the invention does not produce any solid or liquid residues that have to be disposed of. The process according to the invention is therefore distinguished by its extraordinarily high environmental compatibility.

For the subsequent gas scrubbing, processes having both a chemical and a physical action are suitable.

Special advantages can be gained with the way the process is carried out according to the invention in that the gas scrubbing to remove $SO_2$ is carried out with an absorption agent having a physical action. As absorption agents, in this case, all known scrubbing agents having a physical action can be used for $SO_2$ washing, especially organic absorption agents.

With physical gas scrubbing, the absorption agent having a physical action dissolves the components to be removed owing to their partial pressure and their solubility in the absorption agent. No chemical reaction occurs between absorption agent and the components to be removed. While in chemical scrubbing an increase in the $SO_2$ content in the waste gas of the afterburning necessitates an increase in the amount of circulating absorption agent, the circulation of the absorption agent does not change in physical scrubbing since proportionally more $SO_2$ is dissolved in the absorption agent because of the higher partial pressure. The $SO_2$ content in the cleaned gas remains approximately constant regardless of the initial concentration. This characteristic of physical scrubbing has the effect that the energy required for the regeneration of the absorption agent is also almost independent of the $SO_2$ content. The stripping off of the dissolved $SO_2$ in the regeneration requires only a little energy since the forces binding the $SO_2$ are small. Therefore, not only the operating costs, but also the investment costs, of the process according to the invention utilizing physical scrubbing are comparatively advantageous. The consumption figures in the case of the example of such a plant with afterburning placed upstream for a 100 ton per day Claus plant are:

Electrical energy requirement (including cooling tower) 240 Kw fuel at an afterburning temperature of 800° C., e g., sour water-stripping gas 2.5 kmol/h high-pressure steam>25 bars (generation) 2.9 t/h low-pressure steam at 1.5 bars (consumption) 1.0 t/h losses of absorption agents 10 DM/d (1991)

cooling-water make-up 3.0 m³/h

In the case, according to the invention, where less sulfur is reacted directly from the crude gas in the Claus plant, the $SO_2$ concentration after afterburning is correspondingly high. But this fact has hardly any influence on the physical gas scrubbing for the reasons cited above. In designing the process according to the invention, it is therefore readily possible to direct a partial stream of the crude gas directly to afterburning, bypassing the Claus plant. In the case of the process according to the invention, therefore, despite the overall very high sulfur recovery rate, the Claus plant can be designed correspondingly smaller. Thus, operating and investment costs are further reduced.

According to the invention, a temperature of between 850° and 1300° C, preferably between 900° and 1100° C., is set in the Claus furnace of a Claus plant. The $SO_2$ that is recovered by the gas scrubbing and recycled to the Claus plant is limited quantitatively (only) by the fact that the recycled $SO_2$ must not drop the temperature of the combustion chamber of the Claus furnace below 850° C. Otherwise, additional measures are necessary for preheating.

According to an embodiment of the process according to the invention, the Claus plant, in addition to the Claus furnace, contains one or more catalytic and/or thermal reactors for the production of sulfur, as well as condensers for recovery of sulfur or separation of the elementary sulfur from the gas stream.

Advantageously, in this case, the first catalytic reactor is run with a starting temperature of 170° to 220° C. Advantageously, the starting temperature in the first catalytic reactor is between 1° and 10° C., preferably between 3° and 5° C., higher than the outlet temperature of a condenser placed upstream for separation of sulfur. The last condenser in the direction of flow for sulfur recovery is preferably operated at a temperature of between 130° C. and 170° C., preferably between 140° C. and 160° C. As a result, in addition to a reduction in fouling, the production of higher-grade steam is also made possible. The reduced separation of sulfur is offset by the process according to the invention.

In another embodiment of the process according to the invention, the Claus plant consists exclusively of thermal stages for the production of sulfur, optionally with condensers for the separation of sulfur or from a direct-oxidation Claus plant.

Advantageously, catalytic or thermal afterburning is used in the process according to the invention. The waste gas stream is minimal with catalytic afterburning since the combustion temperature is lower than in thermal afterburning and thus less fuel is necessary for afterburning. The limits of usability of catalytic afterburning and thus the particular case where thermal afterburning is used can result from excessively small conversions of harmful substances, such as, for example, COS and $CS_2$, or from excessively high reaction temperatures, which would damage or destroy the catalyst, or in the presence of catalyst poisons.

The process according to the invention uses all combustible components contained in the Claus waste gas, such as, for example, hydrocarbons, CO, $H_2$, sulfur vapor, $H_2S$, $CS_2$, COS, $NH_3$, and HCN, as combustible gas for the afterburning. In addition, inexpensive, sulfur-containing fuel, instead of the expensive, sulfur-free fuel that is needed with conventional processes, can be consumed both in the reheating in the Claus plant and in afterburning. In particular, waste gas from sour water stripping, the so-called sour water-stripping waste gas, can be fed to the afterburning as combustible gas instead of having to be directed through the Claus plant, as is necessary in the case of conventional processes. Thus, the known problems associated with sour water stripping waste gases are avoided, such as, for example, plugging of the heat exchanger, soot formation, discolored sulfur, corrosion, catalyst sulfation.

In a further embodiment of the process according to the invention, water that is produced by reaction in the afterburning is condensed out before the gas scrubbing to remove $SO_2$ and is used for cooling this gas scrubbing.

BRIEF DESCRIPTION OF THE DRAWINGS

The invention is explained in more detail below based on several embodiments presented in the figures.

Here, there are shown in.

Figure 1:
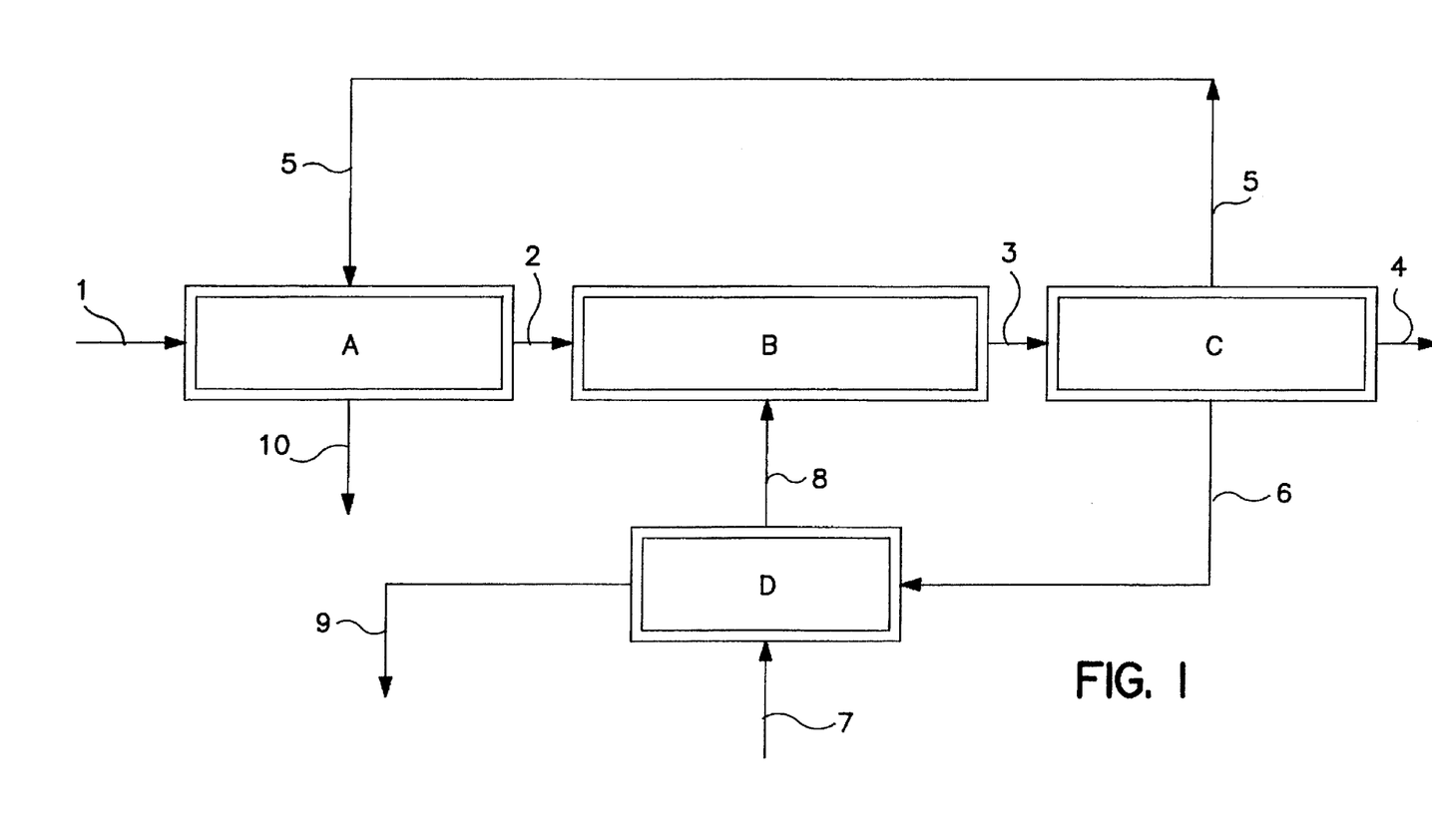
FIG. 1 A block diagram of a Claus plant with afterburning and downstream $SO_2$ washing, FIG. 2 a schematic flowsheet of a single-stage Claus plant with Claus furnace and a schematic flowsheet of catalytic reactor, as well as thermal afterburning, FIG. 3 a schematic flowsheet of an exclusively thermal Claus plant with thermal afterburning, FIG. 4 a schematic flowsheet of a single-stage Claus plant without a Claus furnace with thermal afterburning, and FIG. 5 a schematic flowsheet of $SO_2$ scrubbing according to the invention as an example.

Equivalents are marked with the same reference symbols or reference numbers in all of the figures. In the block diagram of FIG. 1, a Claus crude gas 1 is fed to a Claus plant A. Claus waste gas 2 is provided to afterburning B. Waste gas 3 from afterburning B is ultimately sent to gas scrubbing stage C, where $SO_2$ is scrubbed out. Cleaned gas is drawn off from the gas scrubbing stage C via pipe 4. The $SO_2$ recovered in the regeneration of the absorption agent of the gas scrubbing stage C is fed back via pipe 5 to Claus plant A. Process condensate that accumulates in the gas scrubbing stage C is fed via pipe 6 to stripping stage D. The process condensate from pipe 6 is stripped with air from pipe 7. The stripped process condensate in pipe 9 consists mainly of water and can be processed into, e.g., boiler feedwater. Stripping waste gas 8 is used in afterburning B of Claus waste gas 2. Elementary sulfur recovered in Claus plant A is drawn off via pipe 10.

Figure 2:
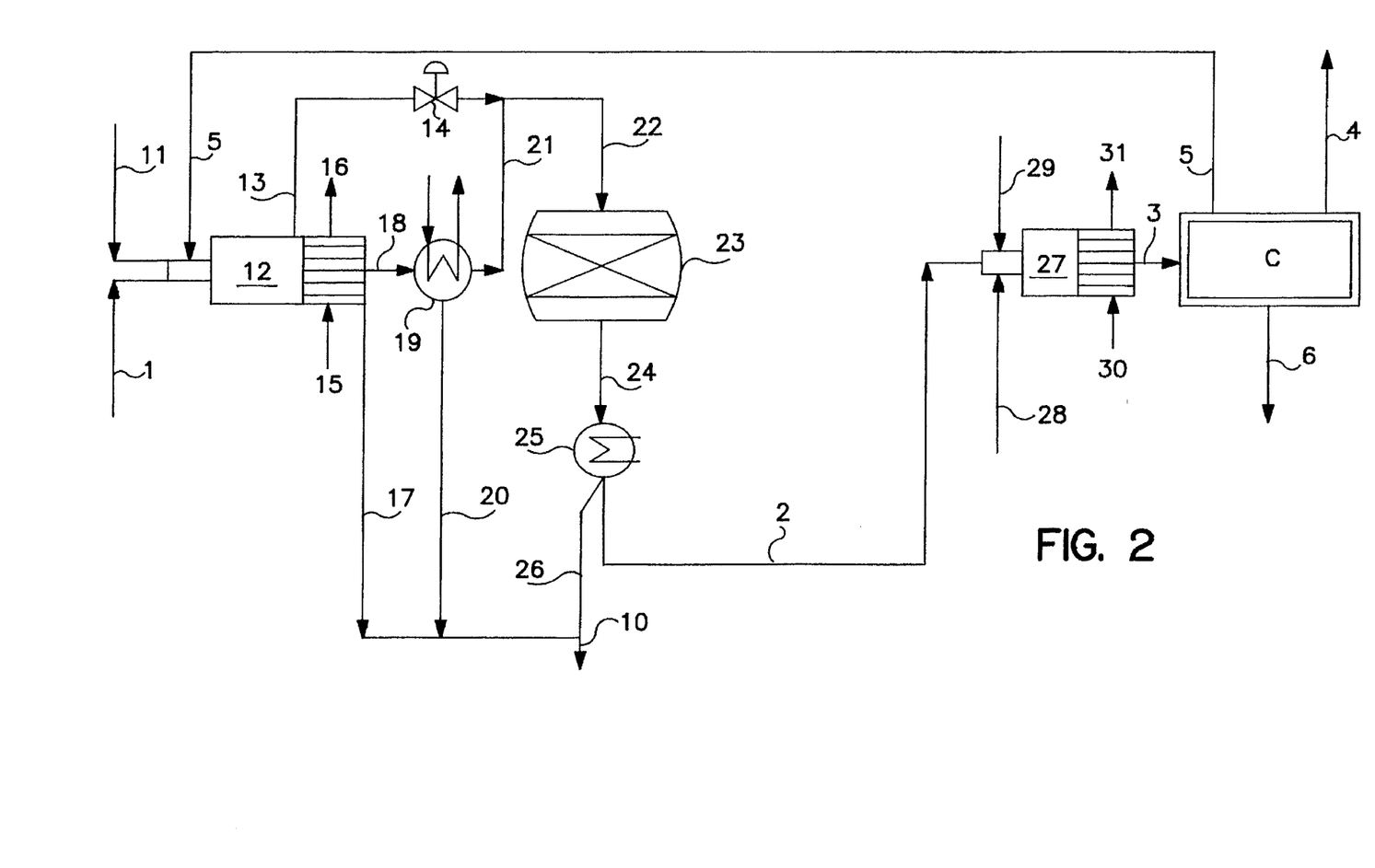

In the case of the embodiment shown in FIG. 2, Claus crude gas 1, optionally air 11 and recycled $SO_2$ 5, is provided to a Claus furnace 12. A part of the Claus reactor waste gas is limited quantitatively by control valve 14 on pipe 13, drawn off hot from the Claus furnace, while the residual Claus reactor waste gas is cooled by the evaporation of boiler feedwater 15 and drawn off via pipe 18. The steam generated by evaporation of boiler feedwater 15 accumulates in pipe 16. With the cooling of condensed elementary sulfur, it is drawn off via pipe 17 from Claus furnace 12.

The precooled Claus furnace waste gas in pipe 18 continues to be cooled, and again elementary sulfur is condensed and drawn off via pipe 20. The Claus furnace waste gas at hand in pipe 21 after cooling 19 is mixed with hotter Claus furnace waste gas from pipe 13 and fed via pipe 22 to catalytic reactor 23. Control valve 14 is adjusted in this case in such a way that the gas stream in pipe 22 has a temperature of 170° to 220° C. This starting temperature of catalytic reactor 23 is between 1° and 10° C., preferably between 3° and 5° C., higher than the temperature of the gas stream in pipe 21. Gas stream 24 that is drawn off from catalytic reactor 23 is cooled (25), and elementary sulfur condensed by cooling 25 is drawn off via pipe 26. The elementary sulfur recovered inside the Claus plant from pipes 17, 20 and 26 is merged in pipe 10. Cooling 25 of gas stream 24 takes place only to the extent that gas stream 2 conveyed from the Claus plant to thermal afterburning 27 has a temperature of about 160° C. Combustible gas is fed via pipe 28, and air is fed to afterburning 27 via pipe 29. Some of the heat that accumulates in thermal afterburning 27 is used for the generation of steam 31 from boiler feedwater 30. The waste gas from the afterburning is conveyed via pipe 3 to gas scrubbing C. $SO_2$-rich gas from gas washing C is fed back via pipe 5 to the Claus plant. With the process shown in FIG. 2, Claus crude gas streams with an $H_2S$ content of 40 to 100% by volume can be processed. When pure oxygen is used instead of air, even crude gas in the range of 20 to 100% by volume of $H_2S$ can be processed.

Figure 3:
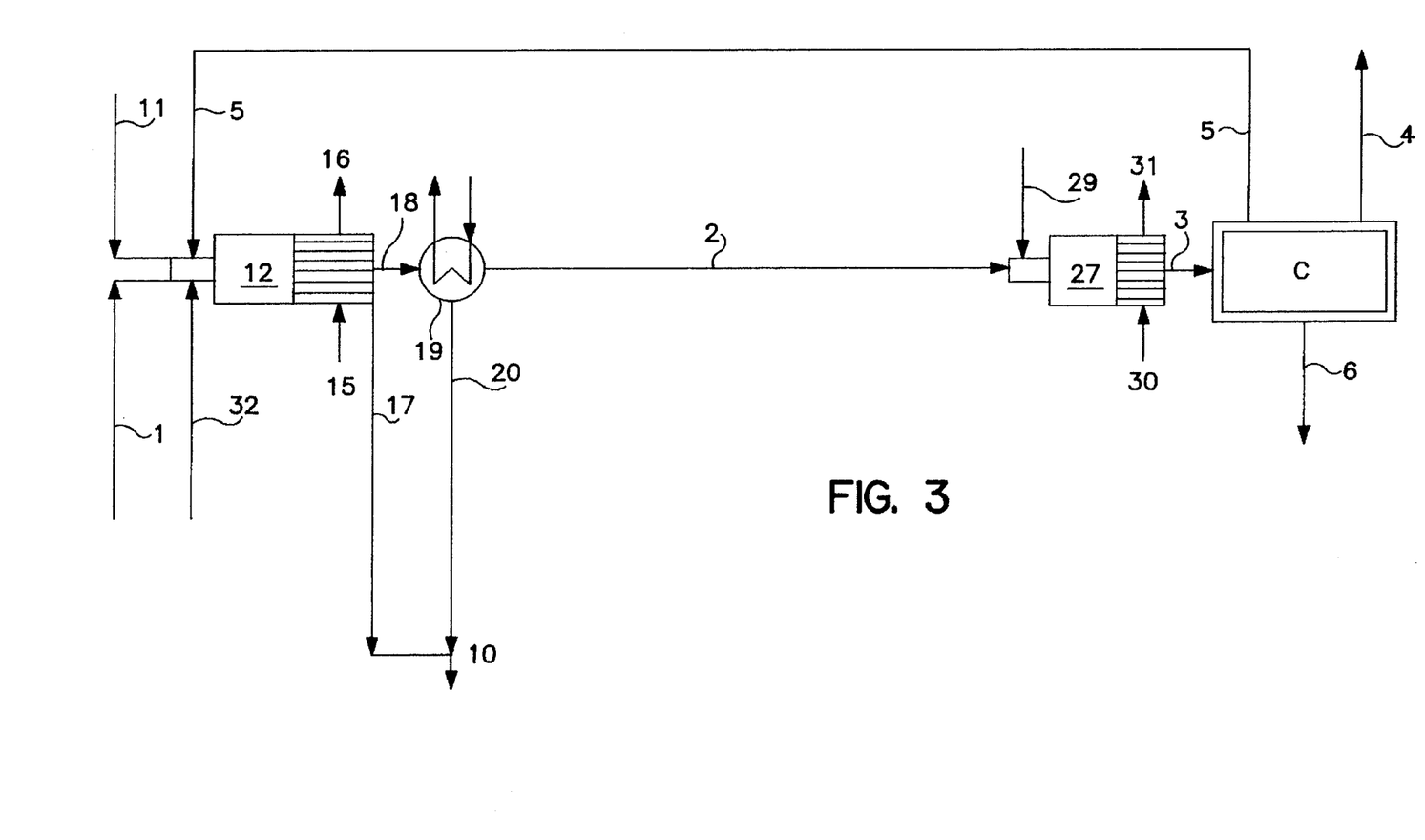

The process shown in FIG. 3 comprises an exclusively thermal Claus plant. In Claus furnace 12, Claus crude gas 1, air 11, fuel 32, and recycled $SO_2$-rich gas 5 are provided. Waste gas 2 from the Claus plant is—as already stated in connection with the process diagram of FIG. 2—conveyed to afterburning and gas scrubbing. The process shown in FIG. 3 makes it possible to process Claus crude gases with an $H_2S$ content of 80 to 100% by volume when air is used and of Claus crude gases with an $H_2S$ content of 40 to 100% by volume when pure oxygen is used.

Figure 4:
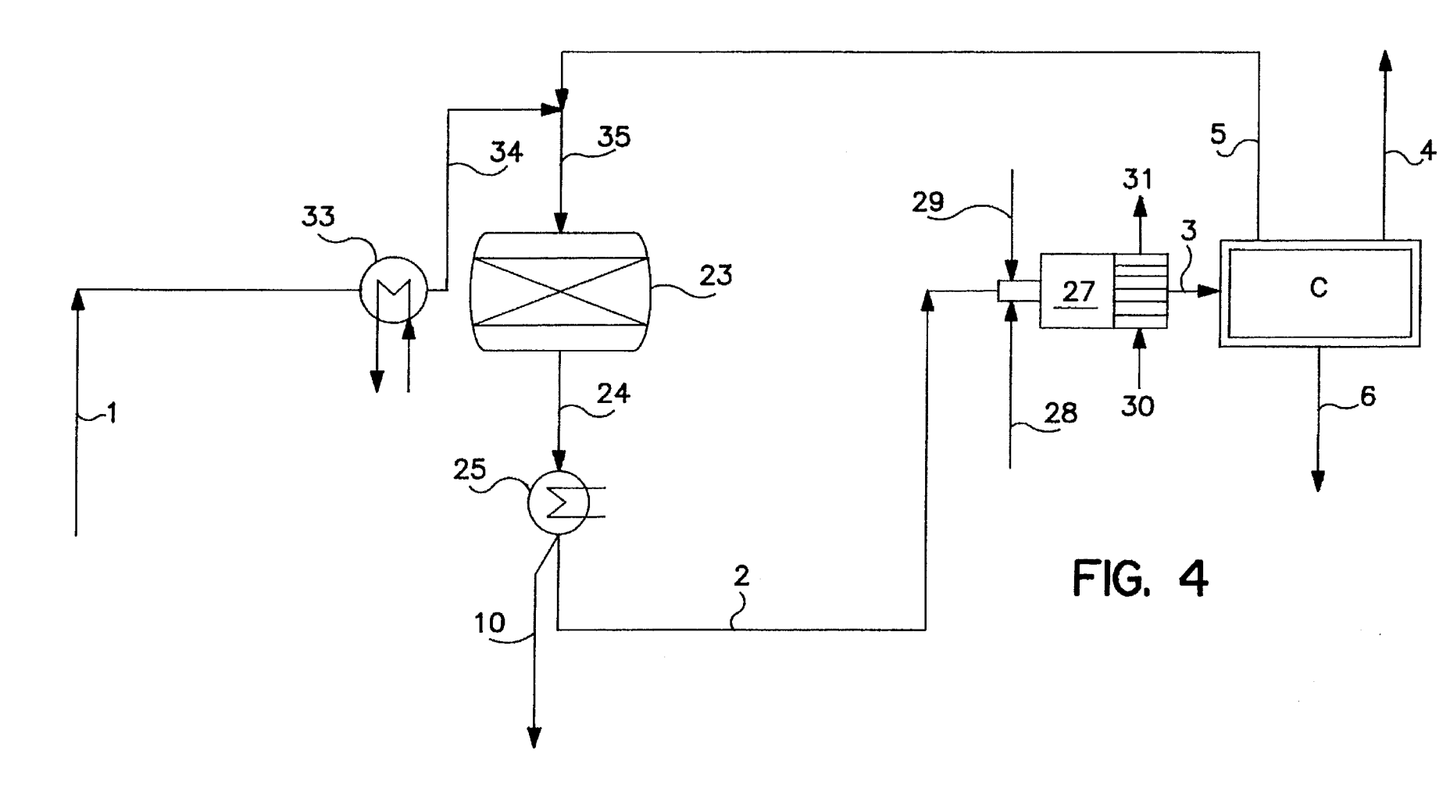

The Claus plant shown in FIG. 4 with a single reactor without a Claus furnace can be used for processing relatively cleaner Claus crude gas streams with an $H_2S$ content of 0.5 to 20% by volume. Crude gas stream 1 is cooled (33) and mixed via pipe 34 with $SO_2$-rich gas 5 that is recycled from gas scrubbing C fed via pipe 35 to catalytic reactor 23. Gas stream 24 that is drawn off from the reactor is cooled (25), and condensed sulfur is drawn off via pipe 10. The waste gas of the Claus plant from pipe 2 is then subjected to afterburning and gas scrubbing—as already stated in connection with the process diagram of FIG. 2.

Figure 5:
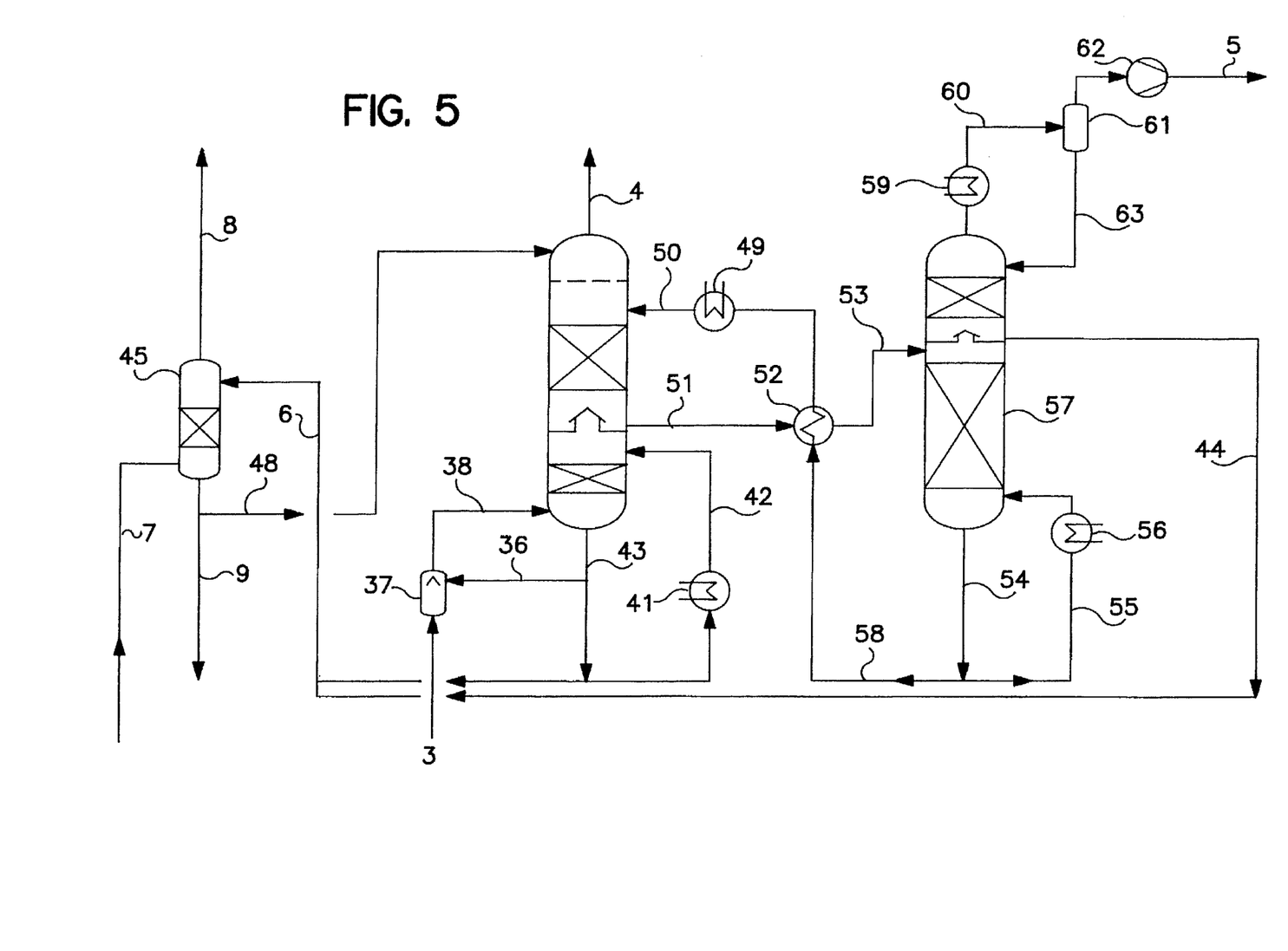

Physical gas scrubbing according to the invention with stripping of the process condensate from the gas scrubbing is explained in the process diagram shown in FIG. 5. Here, the process diagram in FIG. 5 presents an example for gas scrubbing C and stripping D of FIG. 1. Claus waste gas 3 is quenched (37) with water from pipe 36 and fed via pipe 38 to the lower area of scrubbing column 40. In the lower area of scrubbing column 40, water scrubbing is performed with process condensate 42 consisting essentially of water, which is drawn off (43) from the bottom of scrubbing column 40 and, after cooling (41), is fed again to the lower section of scrubbing column 40. This direct-contact condenser in the lower area of scrubbing column 40 further reduces the gas temperature of the Claus waste gas and simultaneously condenses the bulk of the water that is produced by the Claus reaction. The process condensate that is not branched (36) from process condensate 43 for the water quenching or is separated for the water scrubbing via pipe 42 is mixed with process condensate that accumulates from regeneration in pipe 44 and is fed via pipe 6 to stripping column 45. There, the process condensate is stripped with combustion air 7 for afterburning. Sulfur components stripped from process condensate 6 in stripping column 45 are conveyed with the combustion air via pipe 8 from stripping column 45 to afterburning. From the foot of stripping column 45, scrubbed process condensate is drawn off via pipe 9, which can be processed, for example, into boiler feedwater. A part of the process condensate that is stripped and drawn off from the foot of stripping column 45 is provided via pipe 48 to the head of scrubbing column 40. This process condensate stream is used for backwashing of the scrubbing agent at the head of scrubbing column 40, so that cleaned gas 4 that is free of sulfur and absorbing agent is drawn off from the head of scrubbing column 40. Absorption agent that has a physical action and is precooled (49) with cooling water is conveyed to scrubbing column 40 via pipe 50. Above the bottom of the chimney, which separates the actual scrubbing area of scrubbing column 40 from the direct-contact condenser in the lower area, absorption agent is drawn off via pipe 51 from scrubbing column 40. Charged absorption agent from pipe 51 is warmed in heat exchanger 52 against regenerated absorption agent from pipe 58 and fed via pipe 53 to regeneration column 57. Regenerated absorption agent is drawn off from the bottom of regeneration column 57 via pipe 54 and warmed with low-pressure steam to some extent via pipe 55 in boiler 56 and again fed to regeneration column 57. In this case, boiler 56 is heated by warming at a temperature level of about 100° to 140° C., e.g., by the low-pressure steam that accumulates in the direction of flow of the last sulfur condenser of the Claus plant. The overhead product of regeneration column 57 is cooled (59) and fed via pipe 60 to separator 61. In separator 61, condensate that is condensed from the overhead production of regeneration column 57 is fed back via pipe 63 to the head of regeneration column 57. $SO_2$-rich gas is drawn off from separator 61 and fed back via compressor 62, usually a water-ring pump, to the Claus plant via pipe 5. From the upper area of regeneration column 57, process condensate is drawn off above the bottom of the chimney via pipe 54 and conveyed via pipe 6 to stripping column 45.

What is claimed is:

1. In a process for the desulfurization of a crude gas stream containing at least hydrogen sulfide comprising the steps:

passing said crude gas stream to a Claus plant to produce elemental sulfur and a waste gas;

subjecting the Claus waste gas to a combustion zone to form sulfur dioxide;

scrubbing the waste gas from the combustion zone to recover sulfur dioxide, and recycling the sulfur dioxide recovered from the scrubbing, wherein the improvement comprises:

splitting the crude gas stream into two portions;

directly supplying the first portion of the crude gas stream into either a Claus furnace or a direct oxidation Claus plant and separating the sulfur from the Claus off-gas;

supplying the residual Claus off-gas and the second portion of the crude gas stream to a combustion zone to oxidize the sulfur and sulfur compounds within the gases into sulfur dioxide;

supplying the combustion zone off-gas to a scrubbing zone where a physical sorbent separates the sulfur dioxide out of the combustion zone off-gas;

venting the sulfur dioxide-depleted gas from the scrubbing zone;

separating the sulfur dioxide from the physical sorbent, and mixing the separated sulfur dioxide with the first portion of the crude gas stream.

2. A process according to claim 1, wherein the Claus plant, Claus furnace, contains one or more catalytic and/or thermal reactors for sulfur production, each reactor being equipped with a condenser for sulfur recovery.

3. A process according to claim 2, wherein the first catalytic reactor is operated at a starting temperature of 170° to 220° C.

4. A process according to claim 2, wherein the starting temperature of the first catalytic reactor is between 1° and 10° C. higher than the outlet temperature of a condenser placed upstream for sulfur recovery.

5. A process according to claim 4, wherein the last sulfur condenser in the direction of flow is operated at a temperature of between 130° C. and 170° C.

6. A process according to claim 5, wherein the operating temperature of said last condenser is between 140° and 160° C.

7. A process according to claim 4, wherein said starting temperature is between 3° and 5° C. higher than the outlet temperature of a condenser placed upstream for sulfur recovery.

8. A process according to claim 1, wherein the Claus furnace is operated at a temperature of between 850° and 1300° C.

9. A process according to claim 8, wherein the operating temperature of the Claus furnace is between 900° C. and 1100° C.

10. A process according to claim 1, wherein the combustion zone is either a catalytic combustion zone or thermal combustion zone.

11. A process according to claim 1, wherein combustible components contained in the residual Claus off-gas are combusted.

12. A process according to claim 1, wherein sour water-stripping waste gas is also supplied to the combustion zone.

13. A process according to claim 1, wherein water obtained by reaction in the combustion zone is condensed before the step of gas scrubbing to remove $SO_2$.

14. A process according to claim 1, wherein 65–85% of the sulfur atoms contained in the first portion of the crude gas stream in the Claus plant are separated directly therein as elemental sulfur.

15. A process according to claim 1, wherein 65–80% of the sulfur atoms contains in the the first portion of the crude gas stream in the Claus plant are separated directly therein as elemental sulfur.

16. A process according to claim 1, wherein between 25% and 10% of said sulfur atoms originally contained in the crude gas constitute said separated sulfur dioxide mixed with the first portion of the crude gas stream.

17. A process according to claim 1, wherein between 20% and 15% of said sulfur atoms originally contained in the crude gas constitute said separated sulfur dioxide mixed with the first portion of the crude gas stream.

* * * * *